United States Patent
Browne

(10) Patent No.: US 7,866,683 B2
(45) Date of Patent: Jan. 11, 2011

(54) GANGWAY BELLOWS

(75) Inventor: Denis Browne, Trittau (DE)

(73) Assignee: ATG Autotechnik GmbH, Siek (DE)

( * ) Notice: Subject to any disclaimer, the term of this patent is extended or adjusted under 35 U.S.C. 154(b) by 122 days.

(21) Appl. No.: 12/415,614

(22) Filed: Mar. 31, 2009

(65) Prior Publication Data

US 2009/0243257 A1  Oct. 1, 2009

(30) Foreign Application Priority Data

Mar. 31, 2008  (EP) .................................. 08006343

(51) Int. Cl.
*B62D 5/00* (2006.01)
(52) U.S. Cl. ........................................ 280/403; 105/20
(58) Field of Classification Search ................. 280/403; 105/18, 20
See application file for complete search history.

(56) References Cited

U.S. PATENT DOCUMENTS

| | | | | |
|---|---|---|---|---|
| 2,004,231 A * | 6/1935 | Wasson | ........................ | 24/457 |
| 4,798,148 A * | 1/1989 | Girard | ........................ | 105/17 |
| 5,033,395 A * | 7/1991 | Bechu et al. | .................... | 105/18 |
| 5,259,323 A * | 11/1993 | Koch et al. | ..................... | 105/20 |
| 5,487,555 A * | 1/1996 | Koch et al. | ................... | 280/403 |
| 5,546,866 A * | 8/1996 | Koch | ........................... | 105/8.1 |
| 5,884,565 A * | 3/1999 | Koch | ........................... | 105/20 |
| 6,196,132 B1 * | 3/2001 | Hubner | ........................ | 105/18 |
| 7,568,435 B2 * | 8/2009 | Mosaner | ....................... | 105/20 |
| 7,600,772 B2 * | 10/2009 | Koch et al. | ................... | 280/401 |
| 2010/0025960 A1 * | 2/2010 | Tabellini et al. | ............. | 280/403 |
| 2010/0025961 A1 * | 2/2010 | Tabellini et al. | ............. | 280/403 |

* cited by examiner

*Primary Examiner*—Tony H. Winner
(74) *Attorney, Agent, or Firm*—Morrison & Foerster LLP

(57) ABSTRACT

A gangway bellows for lining an intercommunicating gangway between a front car and a rear car which is connected in an articulated fashion to the front car, has a gangway bellows floor that is releasably attached to a gangway bellows body. Two drill holes extend through a first strip which is connected to the gangway bellows floor and through a second strip which is connected to the gangway bellows body. A first bolt and a second bolt are introduced into the drill holes. A securing element which is rigidly connected to the first bolt is provided for the second bolt and has two securing faces which are configured to bear against the end faces of the second bolt in order to hold the first bolt and the second bolt in the drill holes.

13 Claims, 3 Drawing Sheets

GANGWAY BELLOWS

REFERENCE TO RELATED APPLICATION

This application claims the priority of European Patent Application No. 08 006 343.1, filed Mar. 31, 2008, the contents of which are incorporated herein by reference.

FIELD OF THE INVENTION

The invention relates to a gangway bellows with which an intercommunicating gangway between a front car and a rear car of a vehicle such as a bus, tram or railroad train, which is connected in an articulated fashion to the front car is lined. In the gangway bellows, a gangway bellows floor is releasably attached to a gangway bellows body, wherein the gangway bellows floor has a first strip, and the gangway bellows body has a second strip. Two drill holes are formed which respectively extend both through the first strip and through the second strip. A first bolt and a second bolt are introduced into the drill holes in order to secure the two strips relative to one another.

The invention also relates to a method for producing a releasable connection between a gangway bellows floor and a gangway bellows body. In the method, a strip of the gangway bellows floor which has two drill holes is aligned with a strip of the gangway bellows body which also has two drill holes in such a way that the drill holes complement one another to form a first aligned drill hole and a second aligned drill hole. A first bolt and a second bolt are introduced into the aligned drill holes.

BACKGROUND OF THE INVENTION

Gangway bellows of this type are used to permit a passenger to change between the front car and the rear car of a vehicle like a bus, tram or railroad train while travelling without being exposed to the weather. The gangway bellows body usually experiences less wear than the gangway bellows floor. The gangway bellows floor is for this reason often constructed in such a way that it can be replaced separately from the gangway bellows body.

If the connection between the strips is produced by bolts which are plugged into the aligned drill holes, the bolts must, on the other hand, be secured in such a way that they do not become unintentionally released again from the drill holes. If a screwed connection or a riveted connection is provided for securing purposes, each bolt has to be secured individually when assembly is performed. This is complex and time-consuming. In addition, screwed connections have the disadvantage that in the course of time they become stuck by dirt thrown up from the street. For this reason, they can frequently only be released again with difficulty when the gangway bellows is to be replaced. The later release of the bolt is also difficult with riveted connections.

SUMMARY OF THE INVENTION

Taking the prior art mentioned at the beginning as a starting point, the invention is based on the object of presenting a gangway bellows in which the gangway bellows floor can easily be attached to the gangway bellows body and easily released again. In addition, an associated method is to be presented. The object is achieved by means of the features of the invention as broadly disclose herein. Advantageous embodiments can be found in the detailed description below.

According to the invention, in the gangway bellows a securing element which is rigidly connected to the first bolt is provided for the second bolt. The securing element comprises two securing faces which are oriented transversely with respect to the axis of the first bolt, are located opposite one another and are configured to bear against the end faces of the second bolt in order to hold the first and second bolts in their drill holes.

According to the method according to the invention, the first and second bolts are secured in the aligned drill holes by virtue of the fact that the securing element is pivoted about the axis of the first bolt, with the result that the two securing faces enclose the second bolt between them.

Firstly, a number of terms will be explained. The gangway bellows surround the intercommunicating gangway between the front car and the rear car in the upward direction, downward direction and to the sides. The gangway bellows floor provides cover at the bottom. The gangway bellows body covers the intercommunicating gangway at the sides and at the top. The boundary between the gangway bellows floor and the gangway bellows body can be arranged in the floor area or in the lower part of the side wall.

A securing element is then rigidly connected to a bolt when the securing faces are held at a fixed distance and with a specific orientation in relation to the bolt. The term rigid does not exclude the possibility of the material being inherently elastic or of the bolt being able to be rotated about its axis without the securing element moving.

A strip can be a reinforcement element which is connected to the gangway bellows material. It is also possible for the gangway bellows material itself to be reinforced in such a way that it acts as a strip.

The securing element according to the invention makes it possible for both bolts to be secured with a single manual operation. If the securing element is pivoted in such a way that the securing faces bear against the end faces of the second bolt, the second bolt cannot move out of the drill hole in the one direction or in the other direction. At the same time, the first bolt is also held by virtue of the rigid connection in such a way that it cannot move out of the drill hole. This facilitates the assembly of the connection between the gangway bellows floor and the gangway bellows body. If the connection is to be released again, the securing element is in turn pivoted in the opposite direction with a single manual operation, and both bolts can be removed from the drill holes.

When the connection is produced between the gangway bellows floor and the gangway bellows body it is possible to proceed in such a way that in a first step the strip of the gangway bellows floor and the strip of the gangway bellows body are aligned with one another in such a way that two aligned drill holes are produced. Two bolts can then be plugged into the two aligned drill holes and secured. However, in many cases it is easier firstly to align the strips in such a way that only one aligned drill hole is produced, and one of the bolts can be plugged into said drill hole. The two strips can then be pivoted about the first bolt in such a way that a second aligned drill hole is also produced, into which drill hole the other bolt can be plugged. In each case, the bolts which are plugged into the drill holes are finally secured by the securing element by pivoting the securing element about the axis of the first bolt.

The rigid connection between the securing element and the first bolt is preferably formed by means of a connecting strip which extends between one of the securing faces and one end of the first bolt. If the connecting strip extends in the same plane as the securing face, it rests on the strip when both bolts are in the correct position in the drill holes. The connecting strip can at the same time form a stop which defines the correct position of the first bolt in the drill hole.

The connecting strip can be rotatably connected to the first bolt, with the result that the first bolt remains in a fixed position when the connecting strip is pivoted with the securing element. The connecting strip is, however, preferably connected to the first bolt in a rotationally fixed fashion, with the result that the first bolt rotates when the connecting strip is pivoted. The first bolt can most easily be rotated if it has a shape which is rotationally symmetrical with respect to its axis.

The two securing faces are connected to one another by means of a cross connection which extends around the strip. For this purpose, the distance between the cross connection and a plane which extends through the axes of the two bolts is preferably at least twice as large, particularly preferably at least three times as large, as the diameter of the second bolt.

The cross connection is embodied in such a way that the securing faces are held in the correct position on the second bolt by the cross connection. The securing faces are therefore oriented transversely with respect to the axis of the first bolt and are located opposite one another. In addition, the securing faces can be held with respect to one another by the cross connection in such a way that in the relaxed state the distance between them is not larger than, and preferably is at least 10% smaller than, the distance between the end faces of the second bolt. The securing faces have to be spread apart from one another in order to be able to enclose the second bolt between them, and they then bear with a stress against the end faces of the second bolt. The stress counteracts unintentional release of the securing element by the second bolt.

The hold which is exercised by the securing element can be improved further if the securing element is embodied in such a way that it engages behind the strips above the second bolt. The securing element can, for this purpose, comprise clamping sections which adjoin the securing faces and are at a distance from one another which is smaller than the distance between the securing faces.

The clamping sections can be adjoined by guide sections which are inclined toward the outside, with the result that the distance between them is greater than the distance between the clamping sections. If the securing element butts against the underside of the strip during the pivoting about the axis of the first bolt, the guide sections slide along the edges of the strip, with the result that the securing faces and the clamping sections are spread apart from one another. This configuration of the guide sections has the further advantage that when the securing element is released engagement behind them can occur in order to spread apart the clamping sections.

Under certain circumstances, an attachment system which comprises the two bolts and the securing element also provides protection, irrespective of the fact that it is used to attach a gangway bellows floor to a gangway bellows body.

BRIEF DESCRIPTION OF THE DRAWINGS

The invention will be described by way of example below by means of an advantageous embodiment and with reference to the appended drawings, of which.

DETAILED DESCRIPTION OF THE INVENTION

Figure 1:
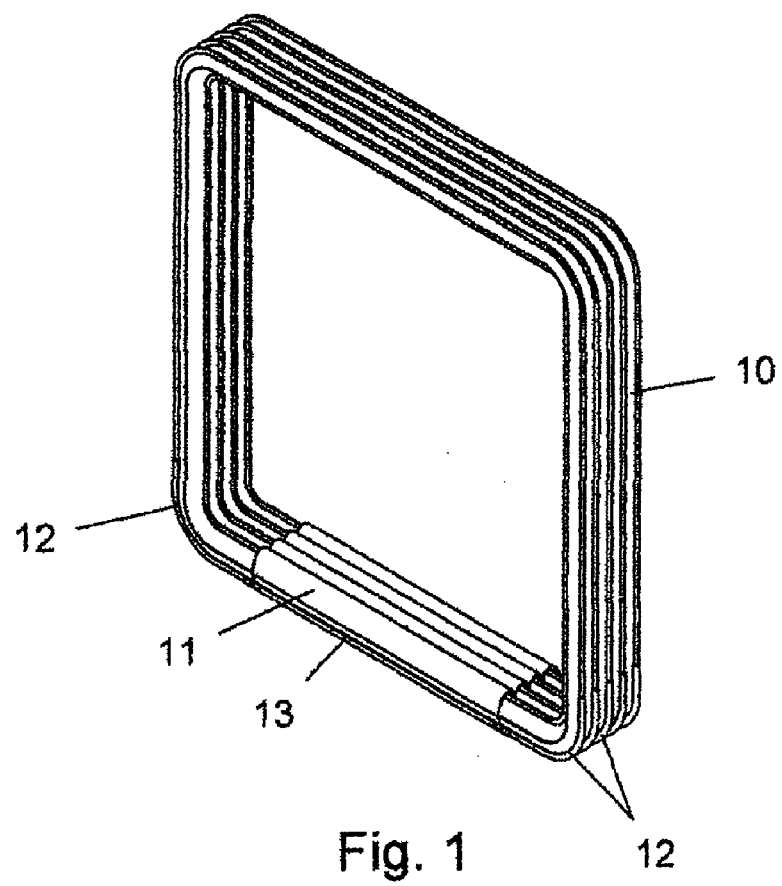
FIG. 1 is a perspective view of a gangway bellows according to the invention.

A gangway bellows which is shown in FIG. 1 comprises a gangway bellows body 10, by which the passage enclosed by the gangway bellows is bounded in the upward direction and to the sides. The gangway bellows body 10 is bent inwards at a right angle at the lower end of the side walls, with the result that the gangway bellows body 10 also covers the passage in the downward direction in the outer region. This region of the gangway bellows body 10 is adjoined by a gangway bellows floor 11 which is releasably connected to the gangway bellows body 10.

In the intercommunicating area, the gangway bellows floor 11 overlaps the gangway bellows body 10.

Figure 2:
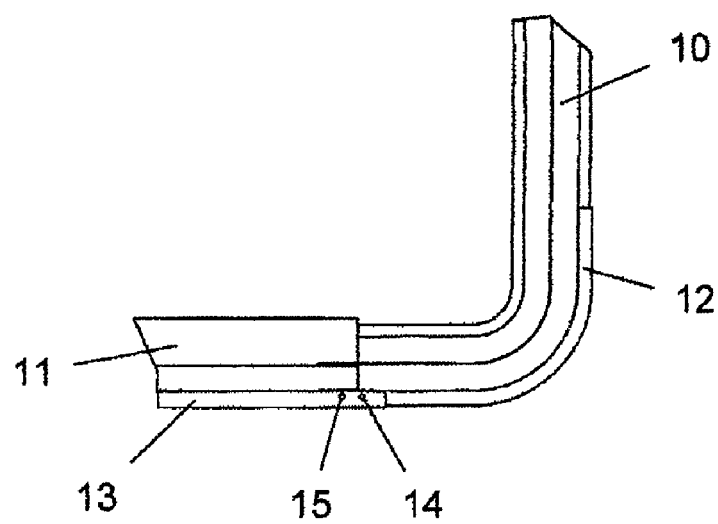
FIG. 2 shows a detail from FIG. 1 in an enlarged front view.

The gangway bellows body 10 and the gangway bellows floor 11 are composed of a flexible material which is reinforced at its edges with a multiplicity of strips 12, 13. One strip 12 of the gangway bellows body 10 and one strip 13 of the gangway bellows floor 11 are shown in FIG. 2. The strip 12 of the gangway bellows body 10 has a U-shaped profile in the intercommunicating area. The strip 13 of the gangway bellows floor 11 is enclosed in the intercommunicating area between the limbs of the U-shaped profile. Two drill holes 14, 15 are formed in the strips 12, 13, said drill holes 14, 15 respectively extending both through the strip 12 of the gangway bellows body 10 and through the strip 13 of the gangway bellows floor 11. The strips 12, 13 can be secured in this position with respect to one another by bolts which are plugged into the drill holes 14, 15, and as a result the gangway bellows floor 11 can be attached to the gangway bellows body 10. Overall, the attachment of the gangway bellows floor 11 requires connections of this type to be formed on a multiplicity of folds.

Figure 3:
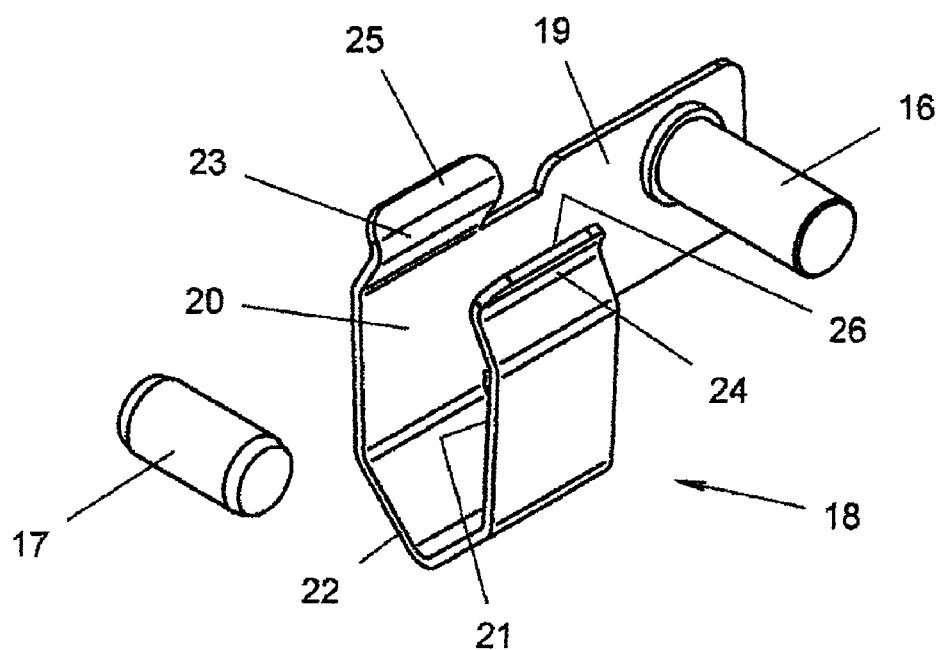
FIG. 3 shows an embodiment of an attachment system according to the invention.
Figure 4:
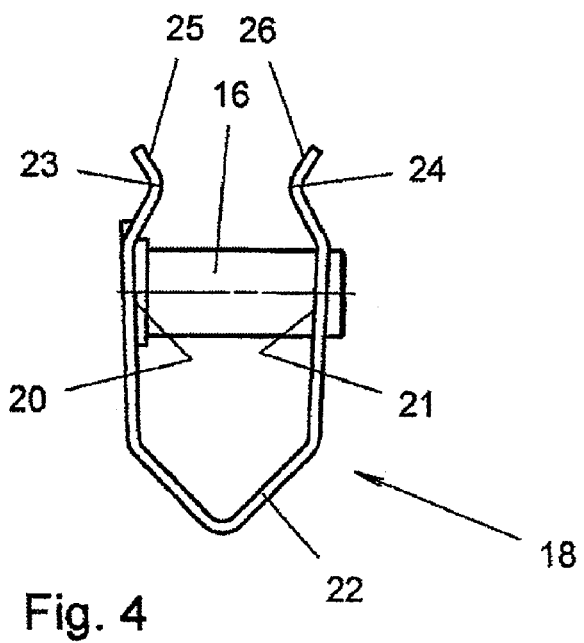
FIG. 4 shows the attachment system from FIG. 3 from a different perspective.

An attachment system with which the connection can be produced between the strips 12, 13 is shown in FIGS. 3 and 4. The attachment system comprises a first bolt 16 and a second bolt 17 which both have a diameter of 6 mm. The bolt 17 is provided as a separate component. The bolt 16 is connected to a securing element 18 via a connecting strip 19. The securing element 18 comprises two securing faces 20, 21 which are at a distance from one another which is somewhat smaller than the distance between the end faces of the second bolt 17. The securing faces 20, 21 are connected to one another via a cross connection 22. The securing faces 20, 21 are adjoined by clamping sections 23, 24 and the distance between the latter is smaller than the distance between the securing faces 20, 21. In turn, guide sections 25, 26 which are at a distance from one another which is larger than the distance between the clamping sections 23, 24 and are inclined toward the outside adjoin on the other side of the clamping sections 23, 24.

If the gangway bellows floor 11 is to be attached to the gangway bellows body 10 by means of this attachment system, the gangway bellows floor 11 is firstly aligned with the gangway bellows body 10 in such a way that the two drill holes in the strip 13 complement the two drill holes in the strip 12 to form two aligned drill holes 14, 15. The bolts 16, 17 are plugged into the drill holes 14, 15, with the bolt 16 being rotated in such a way that the securing element 18 points downwards.

If the bolts 16, 17 are in the correct position, the securing element 18 is pivoted in such a way that the guide sections 25, 26 bear against the lower edge of the strip 12. If the securing element 18 is now pressed further in the direction of the strip 12, the guide sections 25, 26 slide along the strip 12, with the result that the securing element 18 is spread apart. The spreading apart is made possible by a slight degree of elasticity of the cross connection 22. The securing element 18 is pushed further upwards until the clamping sections 23, 24 are located above the strip 12 and engage behind the strip 12. The securing faces 20, 21 now bear against the end faces of the bolt 17, with the result that the bolt 17 can no longer slip out of the drill hole 15. The bolt 16 is also held securely in its position, and can no longer move out of the drill hole 14, by the connecting strip 19 which forms a rigid connection between the securing element 18 and the bolt 16.

Figure 5:
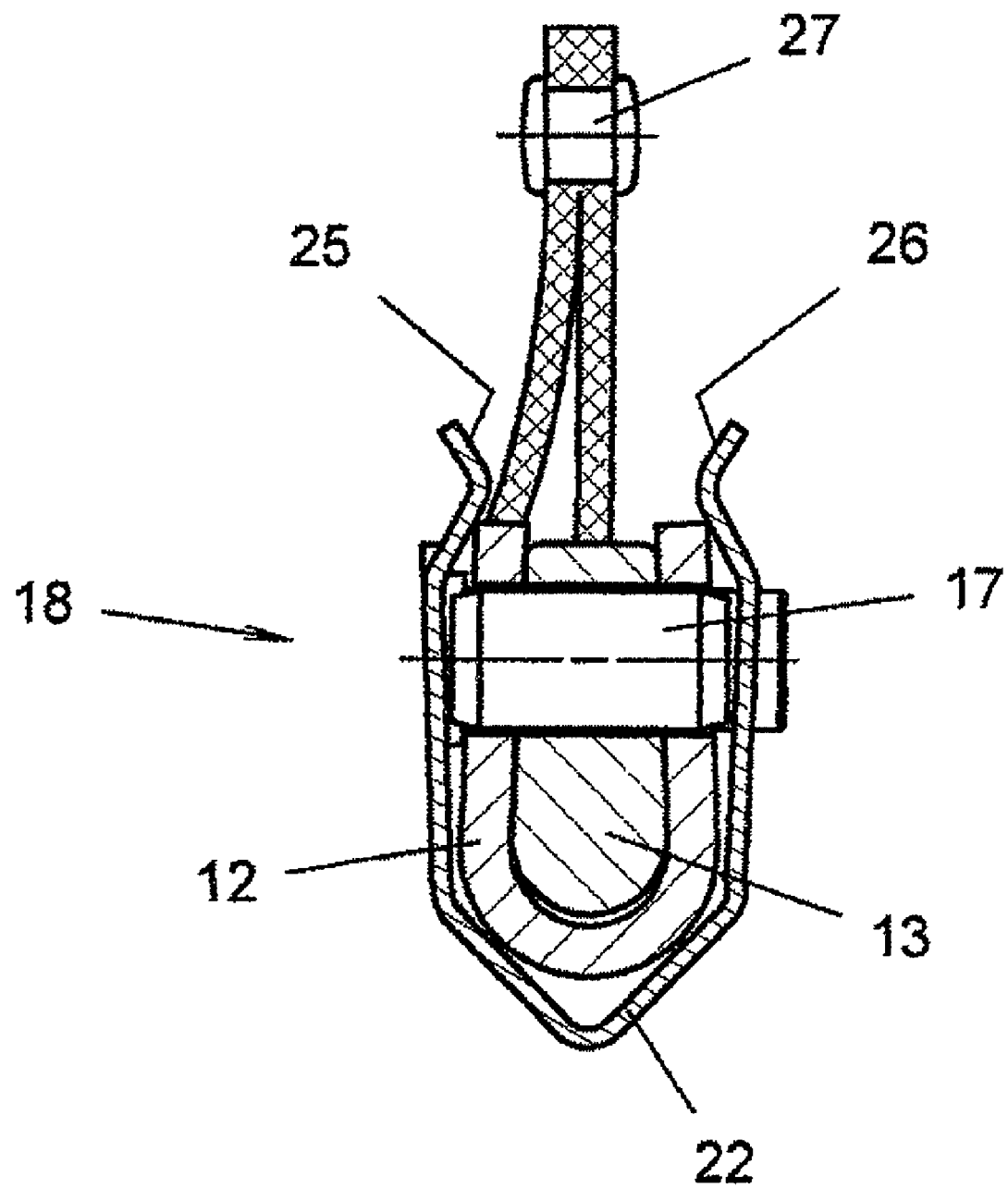
FIG. 5 shows the attachment system in FIGS. 3 and 4 in the installed state.

The strip 13 of the gangway bellows floor 11 is then securely connected to the strip 12 of the gangway bellows body 10 as shown in the sectional illustration in FIG. 5. To permit the cross connection 22 to engage around the strip 12, its distance from the plane in which the axes of the two bolts 16, 17 are located is larger than the diameter of the bolt 17. The sections of the gangway bellows material which point upwards from the strips 12, 13 can be additionally connected to a rivet 27.

In order to release the connection again, the securing element 18 must be pivoted in the opposite direction, so that the bolt 17 is released again. In order to pivot the securing element 18 downwards, it is possible to act on the guide sections 25, 26 and pull the securing element downwards. Alternatively, a screwdriver can be applied to the recess which is present between the cross connection 22 and the strip 12 owing to the bent shape of the cross connection 22, and said screwdriver can be used to lever the securing element 18 downwards.

The invention claimed is:

1. A gangway bellows for lining an intercommunicating gangway between a front car and a rear car which is connected in an articulated fashion to the front car, comprising:
   a gangway bellows body;
   a gangway bellows floor releasably attached to the gangway bellows body, and
   a securing element,
   wherein two drill holes extend through a first strip which is connected to the gangway bellows floor and through a second strip which is connected to the gangway bellows body, respectively,
   wherein a first bolt and a second bolt which are provided as separate components are introduced into the drill holes, and
   wherein the securing element is provided for the second bolt and is rigidly connected to the first bolt, the securing element has two securing faces which are configured to bear against end faces of the second bolt in order to hold the first bolt and the second bolt in the drill holes.

2. The gangway bellows of claim 1, wherein the securing faces are oriented transversely with respect to the axis of the first bolt and are located opposite one another.

3. The gangway bellows of claim 2, wherein the securing element comprises a cross connection between the securing faces, and the distance between the cross connection and a plane which extends through longitudinal axes of the first and second bolts is at least twice as large as the diameter of the second bolt.

4. The gangway bellows of claim 3, wherein the cross connection is elastic.

5. The gangway bellows of claim 3, wherein the distance between the cross connection and the plane which extends through longitudinal axes of the first and second bolts is at least three times as large as the diameter of the second bolt.

6. The gangway bellows of claim 1 or 3, further comprising clamping sections adjoining the securing faces, wherein a distance between the clamping sections is smaller than a distance between the securing faces.

7. The gangway bellows of claim 6, further comprising guide sections adjoining the clamping sections, the guide sections being inclined toward the outside of the gangway bellows so that a distance between the guide sections is greater than the distance between the clamping sections.

8. The gangway bellows of claim 1 or 3, wherein a distance between the securing faces in a relaxed state is not larger than the distance between the end faces of the second bolt.

9. The gangway bellows of claim 6, wherein the distance between the securing faces in a relaxed state is at least 10% smaller than the distance between the clamping sections.

10. The gangway bellows of claim 1 or 3, wherein the first bolt has a shape which is rotationally symmetrical with respect to its longitudinal axis.

11. The gangway bellows of claim 2, wherein the securing element comprises a cross connection between the securing faces, and the distance between the cross connection and a plane which extends through longitudinal axes of the first and second bolts is at least three times as large as the diameter of the second bolt.

12. A method for attaching a gangway bellows floor to a gangway bellows body, comprising:
   a. rigidly connecting first and second bolts separately to two securing faces;
   b. connecting a first strip having two drill holes formed therein to the gangway bellows floor;
   c. orienting the first strip relative to a second strip having two drill holes formed therein;
   d. connecting the second strip to the gangway bellows body in such a way that the drill holes on the first and second strips complement one another to form a first aligned drill hole and a second aligned drill hole;
   e. introducing the first bolt and the second bolt into the aligned drill holes; and
   f. pivoting the securing faces about an axis of the first bolt, with the result that the two securing faces enclose the second bolt between them.

13. The method of claim 12, wherein in steps b. and c. the second drill hole is not oriented until the first bolt has already been introduced into the first aligned drill hole.

* * * * *